United States Patent Office 3,787,553
Patented Jan. 22, 1974

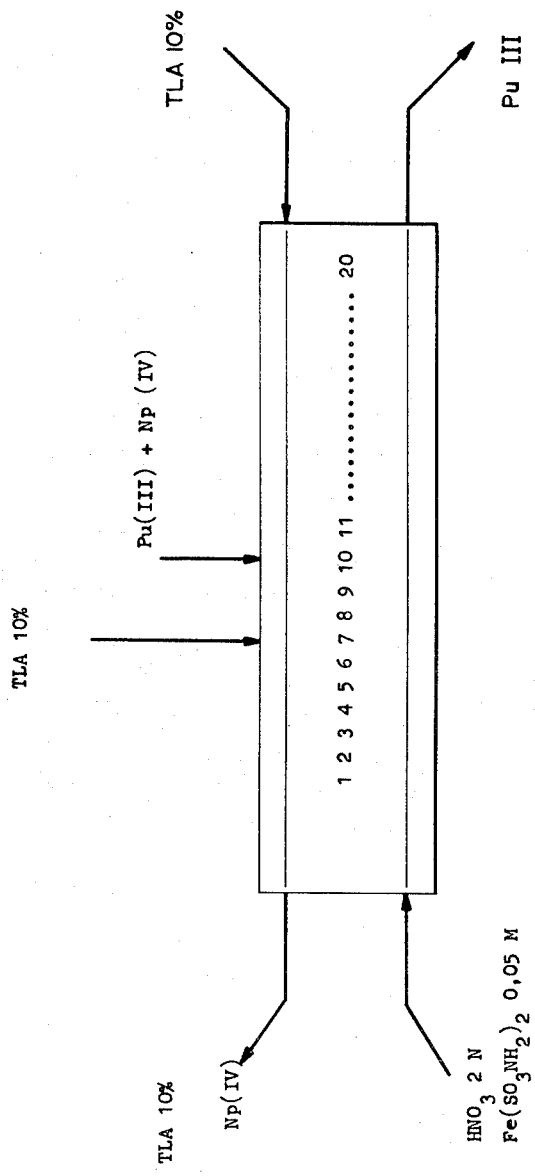

3,787,553
PROCESS FOR THE SEPARATION OF NEPTUNIUM FROM PLUTONIUM BY LIQUID-LIQUID EXTRACTION
Jean Yves Espie, Sceaux, Claude Jouan, Fontenay-aux-Roses, and Gerard Koehly, Maisons-Alfort, France, assignors to Commissariat a l'Energie Atomique, Paris, France
Filed May 27, 1971, Ser. No. 147,518
Claims priority, application France, May 28, 1970, 7019504
Int. Cl. C01g 56/00
U.S. Cl. 423—9                                4 Claims

ABSTRACT OF THE DISCLOSURE

The process for separating neptunium and plutonium contained in nitric acid solutions comprises the steps of endowing the starting solution with a reducing action, contacting the solution with an organic phase consisting of trilaurylamine in solution in an inert solvent in order to extract neptunium of valence IV while the plutonium of valence III remains in an aqueous phase, adding capric acid to the loaded organic phase and washing this latter with a reducing aqueous solution.

---

This invention relates to a process for the separation of neptunium from plutonium by liquid-liquid extraction as applicable especially to the recovery of neptunium-237 from the effluents of irradiated fuel processing plants and to the treatment of irradiated targets of neptunium-237 for the fabrication of plutonium-238.

One of the most important uses of neptunium is related to the development of energy sources which make use of alpha emitters. Neptunium which is intended for the preparation of alpha-ray sources must be freed from all remaining traces of undesirable plutonium isotopes.

Separation of neptunium from plutonium is usually carried out after solubilization in a strong acid medium by selective extraction of one of these elements by an organic solvent and more particularly by the tertiary amines which exhibit a strong affinity for the nitric-acid soluble complexes of tetravalent species. Selectivity of the extraction process is ensured either by reduction of plutonium in the trivalent state or by oxidation of neptunium in the pentavalent state, these elements being no longer extractible in this form.

In fact, selective extraction of plutonium in an oxidizing medium calls for operations entailing adjustment of the medium which are difficult to carry out in practice and it is hardly possible to obtain good decontamination of plutonium and neptunium.

In consequence, the selective extraction of neptunium in a reducing medium has already been considered preferable in processes of the prior art. However, these processes result in a decontamination factor in removal of plutonium from neptunium which still remain unsatisfactory with values generally ranging from 10 to 150.

A difficulty is presented by selective stripping of the small fraction of plutonium which has been entrained with the neptunium in the organic solvent. This stripping problem arises from the strong affinity of alkylammonium nitrates for the tetravalent species of this affinity has a highly unfavorable action on the kinetics of reduction of plutonium (IV) by ferrous salts. Two methods have been proposed for improving the selective stripping of plutonium.

The first method consists in saturating the organic phase with neptunium which lowers the partition coefficient of the tetravalent species and consequently makes it possible to enhance the kinetics of reduction of plutonium (IV). This method can be applied only to the case of treatment of irradiated targets in which the concentration of neptunium and plutonium elements in the feed solution is of a high order.

The second method consists in washing the organic solvent by contacting with a reducing sulfonitric aqueous solution, the addition of sulfate ions being intended to produce a complexing action on the plutonium which passes into the aqueous phase to a partial extent and is reduced therein.

The presence of sulfate ions in aqueous phase results in a reduction of the partition coefficients in the same manner as the saturation of the organic phase and therefore facilitates reduction of plutonium (IV) to plutonium (III). However, the disadvantages of this method are numerous:

The presence of sulfate ions in the effluents is objectionable for subsequent operations (extraction of plutonium after re-oxidation followed by storage of the effluents);

The action of the sulfate ions on the partition coefficients of plutonium (IV) is caused by their complexant and therefore makes the reduction of plutonium (IV) in aqueous phase less easy than in a pure nitric acid medium;

The complexing effect of the sulfate ions can have an unfavorable action on the decontamination factors of elements such as zirconium (IV) which form stable complexes with said ions.

The present invention in tended to overcome these disadvantages while permitting a substantial increase in the decontamination factor in regard to removal of plutonium from neptunium.

The method according to the invention essentially comprises the steps of contacting the solution which contains the elements to be separated and which is made reducing with an organic phase constituted by trilaurylamine in solution in an inert solvent which extracts the neptunium of valence IV while the plutonium of valence III remains in the aqueous phase, adding capric acid to the loaded organic phase and washing of said organic phase with a reducing aqueous solution.

The addition of capric or decanoic acid having the formula $CH_3(CH_2)_8COOH$ to the organic phase which contains neptunium and a small fraction of plutonium makes it possible to reduce the partition coefficient of the tetravalent plutonium in the washing stage, with the results that a substantial fraction of the plutonium which is present in the organic solvent is stripped by the aqueous wash solution, thereby permitting effective reduction of the plutonium by the reducing agent which is contained in said aqueous solution.

The examples which are given hereinafter illustrate the operation of the process according to the invention and demonstrate the improvement achieved in the separation of neptunium and plutonium as compared with methods of the prior art.

In Example 1, consideration has been given to the influence of the concentration of capric acid on the partition coefficients of neptunium and plutonium in trilaurylamine in solution in "Solgil" (10 volume percent of TLA).

Example 2 describes the application of the process in a bank of mixer-settlers in accordance with the arrangement shown in the figure.

EXAMPLE 1

The organic phase consisting of 0.16 M triluarylamine nitrate and capric acid having a concentration within the range of 0 to 0.5 M and loaded with neptunium (IV) and with plutonium (III) is contacted with an aqueous phase which has the following composition:

1 N $HNO_3$
0.1 M $Fe(SO_3NH_2)_2$
0.1 M $NH_2$—$NH_2$

There is shown in Table I below the variation of partition coefficients of neptunium (IV), of the mixture of plutonium (III) and plutonium (IV) as well as the resultant variation of the separation factor $$\alpha = \frac{Kd\,\text{Np}}{Kd\,\text{Pu}}$$

TABLE I

| 10% TLA capric acid var. | 0 M | 0.125 M | 0.25 M | 0.375 M | 0.5 M |
|---|---|---|---|---|---|
| $Kd$ Np | 37 | 6.6 | 2.15 | 1.12 | 0.58 |
| $Kd$ Pu | 7.15 | 0.228 | 0.054 | $1.53 \times 10^{-2}$ | $2 \times 10^{-3}$ |
| $\alpha = Kd$ Np/$Kd$ Pu | 5.18 | 29 | 39.8 | 73.2 | 290 |

The combined effect of the reducing power of Fe (II) and of reduction in the partition coefficients of the tetravalent species by addition of capric acid to the trilaurylamine gives rise to a reduction in the partition coefficient of the plutonium which is much faster than that of the neptunium, thereby increasing the separation factor of these two elements.

Table I shows that a separation factor which is higher than 50 can readily be achieved in respect of a capric acid concentration which is either equal to or higher than 0.3 M.

EXAMPLE 2

A solution containing 4.8 g./l. of plutonium and 0.64 g./l. of neptunium was treated in countercurrent flow within a bank of mixer-settlers consisting of twenty stages.

The solution was previously treated with hydrazine (0.05 M/l.) at 60° for a period of two hours in order to reduce the plutonium to the valence state of III. The neptunium is not reduced and remains in the valence state of IV. 0.05 mole/l. of ferrous sulfamate is added immediately before use and the ratio $Fe^{2+}/Fe^{3+}$ therefore establishes the value of the ratio Pu (III)/Pu (IV) in the aqueous solution.

The extraction is carried in 10 stages by a 0.16 M solution of triluarylamine nitrate in "Solgil."

Washing is carried out in 10 stages by an aqueous solution having the following composition:

2 N $HNO_3$
0.5 M $Fe(SO_3NH_2)_2$

In the six final stages the organic phase is adjusted to 0.16 M in trilaurylamine and 0.31 M in capric acid by adding to the fourth washing stage a small volume of 2 M capric acid in solution in 10% triluarylamine in "Solgil." The liquid-liquid countercurrent flow process is shown diagrammatically in the accompanying figure.

The conditions of use are summarized in Table II hereunder.

TABLE II

Aqueous solution

| | |
|---|---|
| $HNO_3$ | 2 N. |
| $NH_2$—$NH_2$ | 0.05 M. |
| $Fe(SO_3NH_2)_2$ | 0.05 M. |
| Np | 0.64 g./l. |
| Pu | 4.8 g./l. |
| Throughput | 59 ml./hour. |

Organic phase 0.16 M $TLAHNO_3$ in "Solgil"
Throughput = 19.7 ml./hour

Washing solution

| | |
|---|---|
| $HNO_3$ | 2 N. |
| $Fe(SO_3NH_2)_2$ | 0.05 M. |
| Throughput | 5.9 ml./hour. |

Washing organic phase $TLAHNO_3 = 0.16$ M
2 M capric acid in "Solgil"
Throughput = 3.6 ml./hour The results obtained are grouped together in Table III below:

TABLE III

Concentrated of the extract

| | |
|---|---|
| Np | 1.64 g./l. |
| Pu | $0.15 \times 10^{-3}$ g./l. |

Concentration of the raffinate

| | |
|---|---|
| Np | <0.006 g./l. |
| Pu | 4.1 g./l. |
| Np yield | 0.99 |
| Pu decontamination factor | $10^5$ |

RESULTS PER STAGE

| Stages | Ratio of activity, Np/Pu | DF |
|---|---|---|
| 1 | 131 | 1 |
| 2 | 133 | 2.03 |
| 3 | 65.4 | 3.32 |
| 4 | 19.7 | 2.5 |
| 5 | 7.8 | 3 |
| 6 | 2.6 | 5.3 |
| 7 | 0.49 | |
| 10 | 0.114 | |
| 11 | 0.07 | |
| 20 | | |

It should be pointed out that the decontamination factor could be improved to an even greater extent either by increasing the rate of flow of the washing solution or by increasing the number of washing stages.

The total decontamination factor of approximately $10^5$ ($0.98 \times 10^5$) has been attained without taking any special precautions either in regard to preliminary reduction of the plutonium or to establishing of the Pu (III)/Pu (IV) ratio (by adding commercially available ferrous sulfamate) or to the age of the reducing wash solution.

By taking steps to estatblish the ratio $Fe^{2+}/Fe^{3+}$ at the lowest possible value, there is no doubt that the decontamination factor achieved in the Np/Pu separation process would be very much higher than $10^5$.

The advantages of the process in accordance with the invention lie essentially in:

a substantial improvement in the decontamination factor ($10^5$ as compared with a maximum value of $10^3$ in processes of the prior art), simplicity of conditions for the preparation of solutions and establishing of values, absence of any complexing influence on the unextracted plutonium (III), thereby facilitating any subsequent treatment, zero influence of capric acid on the fraction which is extracted from the countercurrent stream.

What we claim is:

1. A process for the separation of neptunium and plutonium which are present in a nitric acid solution comprising the steps of adding to the solution a reducing agent to make the solution reducing, contacting said solution with an organic phase constituted by trilaurylamine in solution in an inert solvent so as to extract the neptunium of valence IV while the plutonium of valence III remains in aqueous phase, adding capric acid to the organic phase which has thus been loaded and washing said organic phase with an aqueous solution of a reducing agent.

2. A process according to claim 1, wherein the concentration of capric acid in the organic phase is at least equal to 0.3 M.

3. A process according to claim 1 or claim 2, wherein the solution to be treated and the washing aqueous solution contains a ferrous salt.

4. A process according to claim 3, wherein the ferrous salt is sulfamate.

(References on following page)

References Cited

UNITED STATES PATENTS

| | | | |
|---|---|---|---|
| 3,047,360 | 7/1962 | Sheppard | 23—340 |
| 3,409,415 | 11/1968 | Moore | 23—340 |
| 3,558,288 | 1/1971 | Burrows | 23—312 |
| 2,942,939 | 6/1960 | Beaton | 260—429.1 X |
| 3,432,276 | 3/1969 | Reas | 23—338 |

FOREIGN PATENTS

| | | | |
|---|---|---|---|
| 1,117,385 | 6/1968 | Great Britain | 23—340 |

OTHER REFERENCES

Korkisch, Modern Method For the Separation of Rarer Metal Ions, 1969, p. 85 (TN QD 63 .S4K6).

Tanaka et al., Extraction of Some Metal Caprates, Chem. Abs., vol. 69, Abs. No. 70537d 1968.

CARL D. QUARFORTH, Primary Examiner

R. L. TATE, Assistant Examiner

U.S. Cl. X.R.

23—312 ME 252—301.1 R; 423—250, 251